July 6, 1937. E. L. KOENIG ET AL 2,086,320
AIR BRAKE CONTROL SYSTEM
Filed April 1, 1937 2 Sheets-Sheet 1
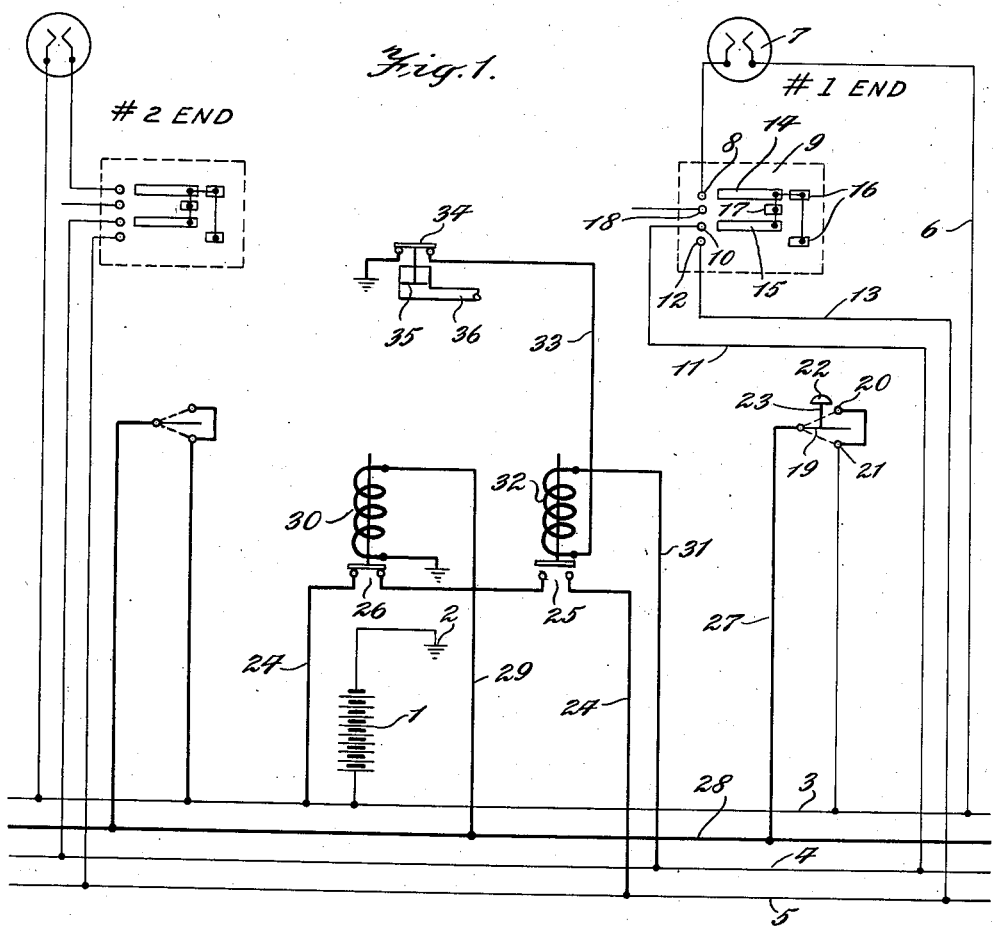
Fig. 1.
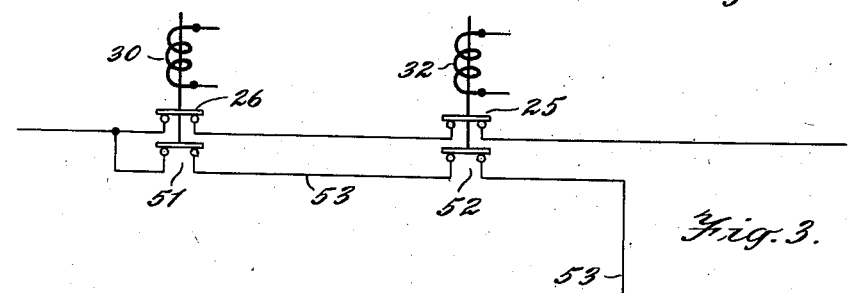
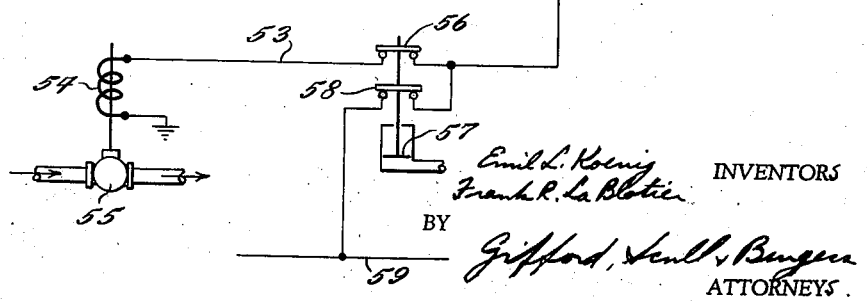
Fig. 3.
Emil L. Koenig
Frank R. LaBlotier INVENTORS
BY Gifford, Scull & Burgess
ATTORNEYS

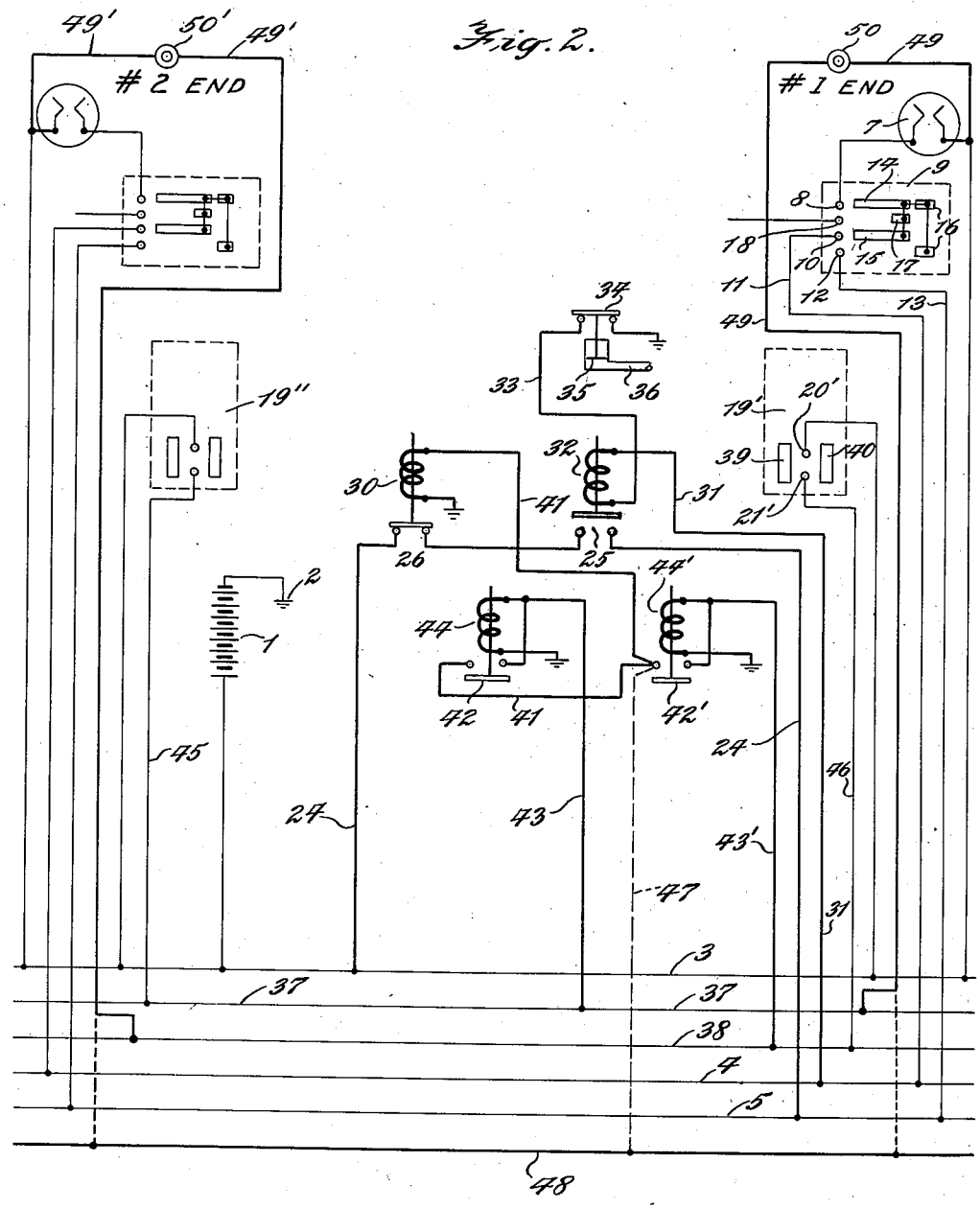

Patented July 6, 1937

2,086,320

UNITED STATES PATENT OFFICE 2,086,320

AIR BRAKE CONTROL SYSTEM

Emil L. Koenig, Brooklyn, and Frank R. La Blotier, Jamaica, N. Y.

Application April 1, 1937, Serial No. 134,290

11 Claims. (Cl. 303—19)

This invention relates to a novel and improved air brake system, particularly for use in connection with the electrical control of air brake systems on motor-driven railway cars. The invention will be best understood from the following description and the annexed drawings in which we have shown selected embodiments of the invention and in which:

Fig. 1 is a schematic wiring diagram of one arrangement of circuits which may be used in the practice of the invention;

Fig. 2 is a similar diagram showing still another embodiment of the invention;

Fig. 3 is a diagram showing an additional feature which may be incorporated in the circuits of either Fig. 1 or Fig. 2.

Referring now to the figures, we have shown the invention as embodied in an arrangement employing certain well-known devices. For the purpose of illustration only, we shall assume that the invention is used in a car driven by an electric motor, it being understood that the invention may be used in a one-car train or in a train of more than one car, or may be used with any car or other vehicle where found applicable.

In all the figures of the drawings, we shall also for the sake of convenience show the new circuits and devices in relatively heavy lines and the conventional or typical devices in relatively light lines.

Referring first to Fig. 1, we have shown an arrangement employing a suitable source of electrical energy exemplified by a battery 1 having one terminal connected to ground 2 and the other to a bus wire 3. There are also provided conductors 4 and 5. These conductors form part of the standard so-called "Westinghouse" system, and their operation is well known in the art.

Connected to the bus wire 3 is a conductor 6 leading through a plug switch 7 to a contact 8 on the electric portion of the air brake control valve 9. This valve also includes a contact 10 connected to a conductor 11 leading to the conductor 4, and also includes a contact 12 connected to a conductor 13 leading to the conductor 5. The valve also includes contacts 14 and 15 adapted to close a circuit between the contacts 8 and 10 and other contacts 16 adapted to close a circuit between the contacts 8 and 12. When the contacts 14 and 15 close the circuit at the contacts 8 and 10, the result will be to apply current to the holding wire 4, and when the contact 17 engages a contact 18, it results in the service application of the brakes. When the contacts 16 close a circuit by engagement of the contacts 8 and 12, the result is to cause an emergency application of the brakes, all as well known in the art.

At the left hand of Fig. 1 is shown a duplication of the circuits just described, it being understood that this arrangement is for use at the other end of the car or train.

The controller for operating the car is provided with the usual reversing key 19 which may have the neutral position shown in full lines or may engage either one of the contacts 20 or 21. When engaging one of these contacts it makes possible a forward operation of the motor, and when engaging the other it makes possible the reverse operation of the motor. There is also provided a usual dead man button 22 which is usually part of the controller handle and which is shown as being connected at 23 to the reversing key 19. This connection 23 is meant to indicate a usual arrangement by means of which, when the reversing key is in neutral or off position, the dead man button is rendered inoperative. This result may be achieved by a number of different ways, the details of which are not necessary to an understanding of the invention and so will not be described.

The arrangement of the dead man button and the reversing key is such that when the key is in engagement with either the contact 20 or the contact 21, the brakes will be set on the car with an emergency application, unless the motorman holds the button depressed with his hand. As soon as he lifts his hand, the brakes are applied with an emergency application. However, when the key is in neutral or off position, as indicated in full lines, and locks the dead man key in inoperative condition or position, then there is nothing to prevent the motorman allowing the car or train to coast, since the button is ineffective. It is, however, considered desirable for other reasons to maintain this locking interrelation between the reversing key and the button. These reasons are not necessary for an understanding of the invention and so will not be dwelt upon here.

We provide a second circuit which, when the reversing key is in the off position shown and the dead man button is consequently inoperative, will automatically cause an emergency application of the brakes, thus making it impossible for the train to coast when the dead man button is inoperative. That circuit comprises a conductor 24 connecting the conductor 5 to the conductor 3, and is provided with two switches 25 and 26. The switch 25 is controlled by the pressure of air in the system which controls the brakes, and the switch 26 is controlled electrically, as will be more fully described presently.

From the key 19 a conductor 27 joins a clearing wire 28 to which is also connected a conductor 29 connected to a magnet 30 of a relay controlling the switch 26. From the conductor 4 leads a conductor 31 through the magnet 32 of a relay controlling the switch 25, the other end of this magnet being connected by a conductor 33 which passes to ground and has therein a switch 34. This switch is controlled by the pressure of air acting against a piston 35, this air being used for the controlling of the brakes.

In operation, when the key 19 is in either forward or reverse position, it will be seen that current may pass from the battery 1 through the key and the conductor 27, back to the clearing wire 28 and thence through the conductor 29 and the magnet 30 holding the switch 26 open. However, if the key 19 is in off position, then the circuit is broken and the switch 26 will be closed by the normal spring action of the relay or by gravity, thus causing emergency application of the brakes, provided the switch 25 is also closed. This switch 25 will be opened whenever the pressure of air against the piston 35 is such as to cause closing of the switch 34. This air is indicated as in a pipe 36 leading to the brake pipe, in an automatic air brake system, in which the pressure should be normally above a certain predetermined point, say, 40 lbs.

Assuming again that the reversing key is in off position, if the brakes have been applied, then the pressure against the piston 35 will be low enough in the system assumed so as to permit the switch 34 to be closed as by gravity or a spring, and this closing of the switch will energize the magnet 32 and open the switch 25. If, however, the brakes are not applied, then in this system the pressure against the piston 35 will be sufficiently high to cause opening of the switch 34 and this will de-energize the magnet 32, allowing the switch 25 to close by gravity or a spring and thus close the circuit through the conductor 24 and cause an emergency application of the brakes.

In other words, the emergency application of the brakes is caused when the reversing key is in off position and the brakes are not applied, whether the train is running or standing still.

Turning now to Fig. 2, we have shown an arrangement which is generally similar to what is shown in Fig. 1 but showing it as applied to a slightly different electric system, in which, in place of the clearing wire 28, we use conductors 37 and 38 which in this system control the destination sign lights.

Many of the parts already described in Fig. 1 are duplicated in Fig. 2 and have been identified by the same numerals. Their description will not be repeated. We have shown, however, a reversing key 19' of different form and comprising contacts 39 and 40 adapted to bridge contacts 20' and 21' for forward or reverse operation. Conductors and connections which have no bearing on an understanding of the invention have been omitted to avoid confusion.

The switch 25 is actuated in the same manner as in connection with Fig. 1 and so further description of that operation is not necessary.

The switch 26 is controlled in a slightly different way than in the other embodiment. The magnet 30 is energized by current passing through a conductor 41 to a switch 42, from which it passes to a conductor 43 to the destination sign wire 37. The switch 42 is closed by energizing of a magnet 44 to which current is supplied through the conductors 45, 37, and 43 when the reversing key 19'' is in either forward or reverse position. When the switch 42 is closed, then current my pass through the conductor 43 and through the switch 42 to the conductor 41 to energize the magnet 30 and open the switch 26.

When the reversing key 19' is in either forward or reverse position, then a similar switch 42' is operated by a magnet 44' receiving energy through a conductor 43' from the other destination sign wire 38 and conductor 46. Either of the switches 42 or 42' will open the switch 26 and render the circuit comprising the conductor 24 inoperative.

As an alternate construction, energy for the magnet 30 may be supplied through a conductor 47 connected to an emergency forestalling control wire 48.

We also provide a circuit comprising a conductor 49 connected to the bus wire 3 and to the conductor 37 through a momentary contact push button switch 50. The object of this circuit is to temporarily render the circuit 24 ineffective, which is done by temporarily energizing the magnet 44 or 44' which will cause energizing of the magnet 30 and consequent opening of the switch 26. As soon as pressure on the button is released, the circuit 49 is again opened and the circuit 24 is effective. The conductor 49 is shown as connected to the line 37, but, as an alternative, may be connected to the line 48, if the conductor 47 is used. In that case, conductor 49 is not connected to conductor 37, but extends directly to the line 48, as shown in dotted lines in Fig. 2. The same result is accomplished from the other end of the car or train by applying current through conductor 49' (see drawings), momentary contact push button switch 50' and conductor 38. An alternate connection between conductor 49' and conductor 48 is shown to be used instead of connection to conductor 38, if conductor 47 is used.

Turning now to Fig. 3, we have shown a supplementary arrangement which may be used with the circuit of Fig. 1 or the circuit of Fig. 2, this arrangement being shown in a separate figure to avoid possible confusion to Figs. 1 and 2.

In Fig. 3, the same magnets 30 and 32 are used to control switches 51 and 52, respectively, these switches being in a conductor 53 which energizes a magnet 54 to open a valve 55 to permit compressed air to pass to the brake cylinder to apply the brakes. In the circuit 53 is a switch 56 controlled by a piston 57 which in turn is controlled by the pressure of air in the brake cylinder pipe or in the brake cylinder itself. The arrangement is such that when enough air has passed the valve 55 after being opened by the magnet 54 to build up the desired pressure in the brake cylinder, then that pressure will operate the piston 57 to open the switch 56 and then the valve 55 will be automatically closed by a spring or the like. Similarly, in case the air compressor is off, the action of the piston 57 will cause closing of a second switch 58 which will supply current to the compressor synchronizing wire 59 or the electric governor for the compressor, to start operation of the compressor until the pressure in the brake cylinder builds up to a point which will cause opening of the switches 56 and 58, in which case not only is the valve 55 closed, as noted above, but the compressor is also cut out.

We claim:

1. In an electrically-controlled air-brake system for a motor-driven car, a dead man button, a reversing switch controlling the motor of the car and having forward and reverse operative positions and a neutral position, in which neutral position the switch renders said dead man button inoperative, a circuit adapted to cause application of the brakes, and means to automatically close said circuit to apply the brakes when said switch is in said neutral position.

2. In an electrically-controlled air-brake system for a motor-driven car, a dead man button, a reversing switch controlling the motor of the car and having forward and reverse operative positions and a neutral position, in which neutral position the switch renders said dead man button inoperative, a circuit adapted to cause application of the brakes, means to automatically close said circuit to apply the brakes when said switch is in said neutral position, and means to automatically open said circuit to release the brakes when said switch is in either of its operative positions.

3. In an electrically-controlled air-brake system for a motor-driven car, a dead man button, a reversing switch controlling the motor of the car and having forward and reverse operative positions and a neutral position, in which neutral position the switch renders said dead man button inoperative, a circuit adapted to cause application of the brakes, means to automatically close said circuit to apply the brakes when said switch is in said neutral position, and other means to automatically close said circuit and controlled by the pressure of air controlling the brakes.

4. In an electrically-controlled air-brake system for a motor-driven car, a dead man button, a reversing switch controlling the motor of the car and having forward and reverse operative positions and a neutral position, in which neutral position the switch renders said dead man button inoperative, a circuit adapted to cause application of the brakes, means to automatically close said circuit to apply the brakes when said switch is in said neutral position, means to automatically open said circuit to release the brakes when said switch is in either of its operative positions, and other means to automatically close said circuit and controlled by the pressure of air controlling the brakes.

5. In an electrically-controlled air-brake system for a motor-driven car, a circuit having a hand-operated controller therein for applying service and emergency braking action, a second circuit adapted when closed to apply emergency braking action, and means to automatically close said second circuit and controlled by the pressure of air controlling the brakes.

6. In an electrically-controlled air-brake system for a motor-driven car, a circuit having a hand-operated controller therein for applying service and emergency braking action, a second circuit adapted when closed to apply emergency braking action, a dead man button, a reversing switch controlling the motor of the car and having forward and reverse operative positions and a neutral position, in which neutral position the switch locks said dead man button in inoperative position, and means to automatically close said second circuit when said switch is in said neutral position.

7. In an electrically-controlled air-brake system for a motor-driven car, a circuit having a hand-operated controller therein for applying service and emergency braking action, a second circuit adapted when closed to apply emergency braking action, a dead man button, a reversing switch controlling the motor of the car and having forward and reverse operative positions and a neutral position, in which neutral position the switch locks said dead man button in inoperative position, means to automatically close said second circuit when said switch is in said neutral position, and other means to automatically close said circuit and controlled by the pressure of air controlling the brakes.

8. In an electrically-controlled air-brake system for a motor-driven car, a dead man button, a reversing switch controlling the motor of the car and having forward and reverse operative positions and a neutral position, in which neutral position the switch renders said dead man button inoperative, a valve controlling the operation of the brakes, a circuit controlling the operation of said valve, and means to control said circuit by the pressure of the air controlling the brakes.

9. In an electrically-controlled air-brake system for a motor-driven car, a dead man button, a reversing switch controlling the motor of the car and having forward and reverse operative positions and a neutral position, in which neutral position the switch renders said dead man button inoperative, a valve controlling the passage of air operating the brakes, a circuit adapted when closed to operate said valve to apply the brakes, a switch in said circuit, means to maintain said switch closed when the pressure of air in the system is insufficient to apply the brakes, and means to open the switch when said pressure is sufficient to apply the brakes.

10. In an electrically-controlled air-brake system for a motor-driven car, a dead man button, a reversing switch controlling the motor of the car and having forward and reverse operative positions and a neutral position, in which neutral position the switch renders said dead man button inoperative, a circuit adapted to cause application of the brakes, means to automatically close said circuit to apply the brakes when said switch is in said neutral position, other means to automatically close said circuit and controlled by the pressure of air controlling the brakes, a valve controlling the passage of air operating the brakes, a circuit adapted when closed to operate said valve to apply the brakes, a switch in said circuit, means to maintain said switch closed when the pressure of air in the system is insufficient to apply the brakes, and means to open the switch when said pressure is sufficient to apply the brakes.

11. In an electrically-controlled air-brake system for a motor-driven car, a circuit having a hand-operated controller therein for applying service and emergency braking action, a second circuit adapted when closed to apply emergency braking action, a dead man button, a reversing switch controlling the motor of the car and having forward and reverse operative positions and a neutral position, in which neutral position the switch locks said dead man button in inoperative position, means to automatically close said second circuit when said switch is in said neutral position, other means to automatically close said circuit and controlled by the pressure of air controlling the brakes, a valve controlling the passage of air operating the brakes, a circuit adapted when closed to operate said valve to apply the brakes, a switch in said circuit, means to maintain said switch closed when the pressure of air in the system is insufficient to apply the brakes, and means to open the switch when said pressure is sufficient to apply the brakes.

EMIL L. KOENIG.
FRANK R. LA BLOTIER.